June 30, 1953
A. C. STOVER
2,643,895
SWINGABLE AXLE STABILIZER SYSTEM FOR
PARALLELING NATURAL STEERING FORCES
Filed Oct. 3, 1949
2 Sheets-Sheet 2
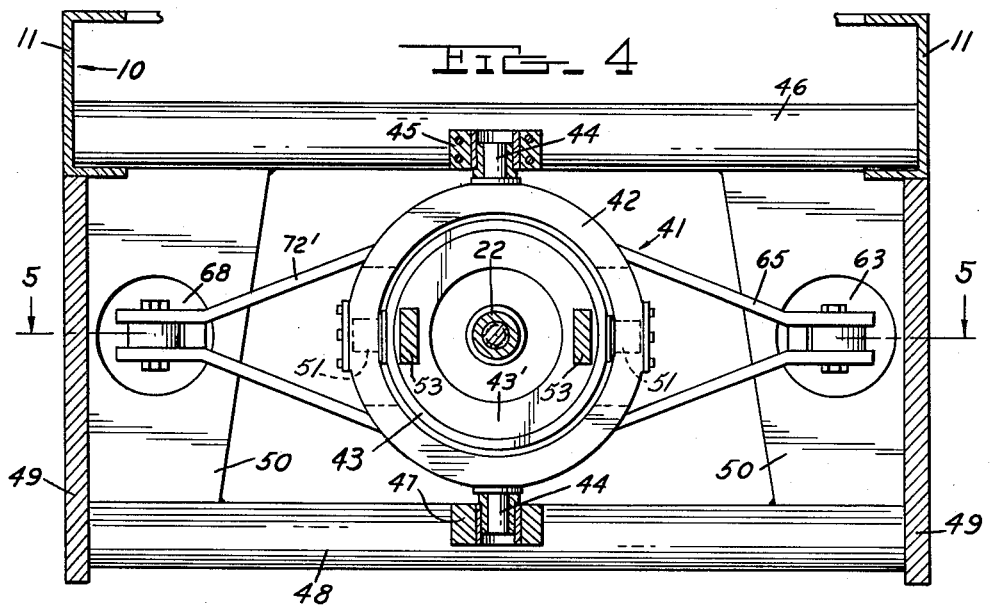
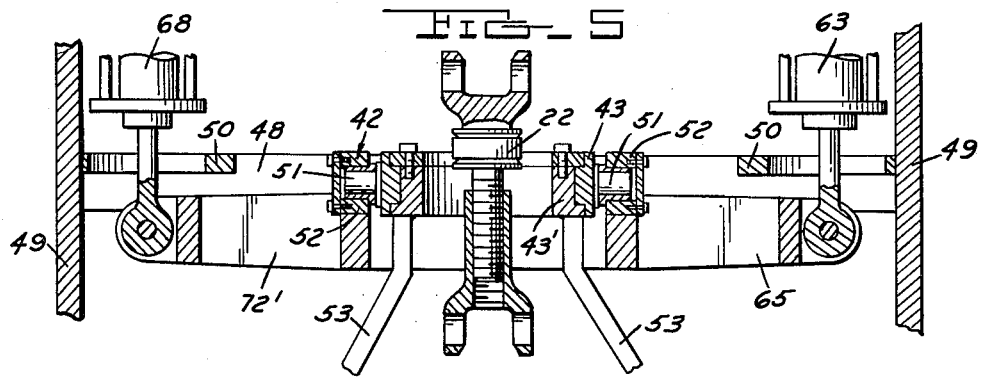
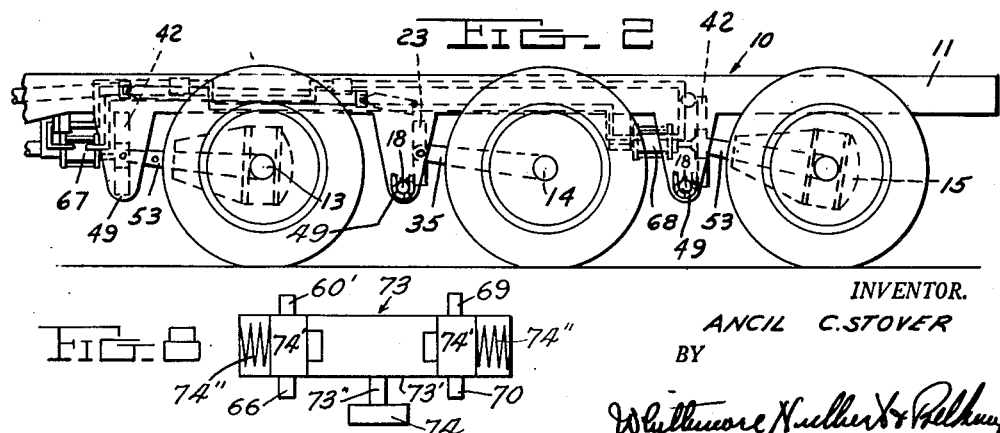
INVENTOR.
ANCIL C. STOVER
BY
Whittemore Hulbert & Belknap
ATTORNEYS Patented June 30, 1953

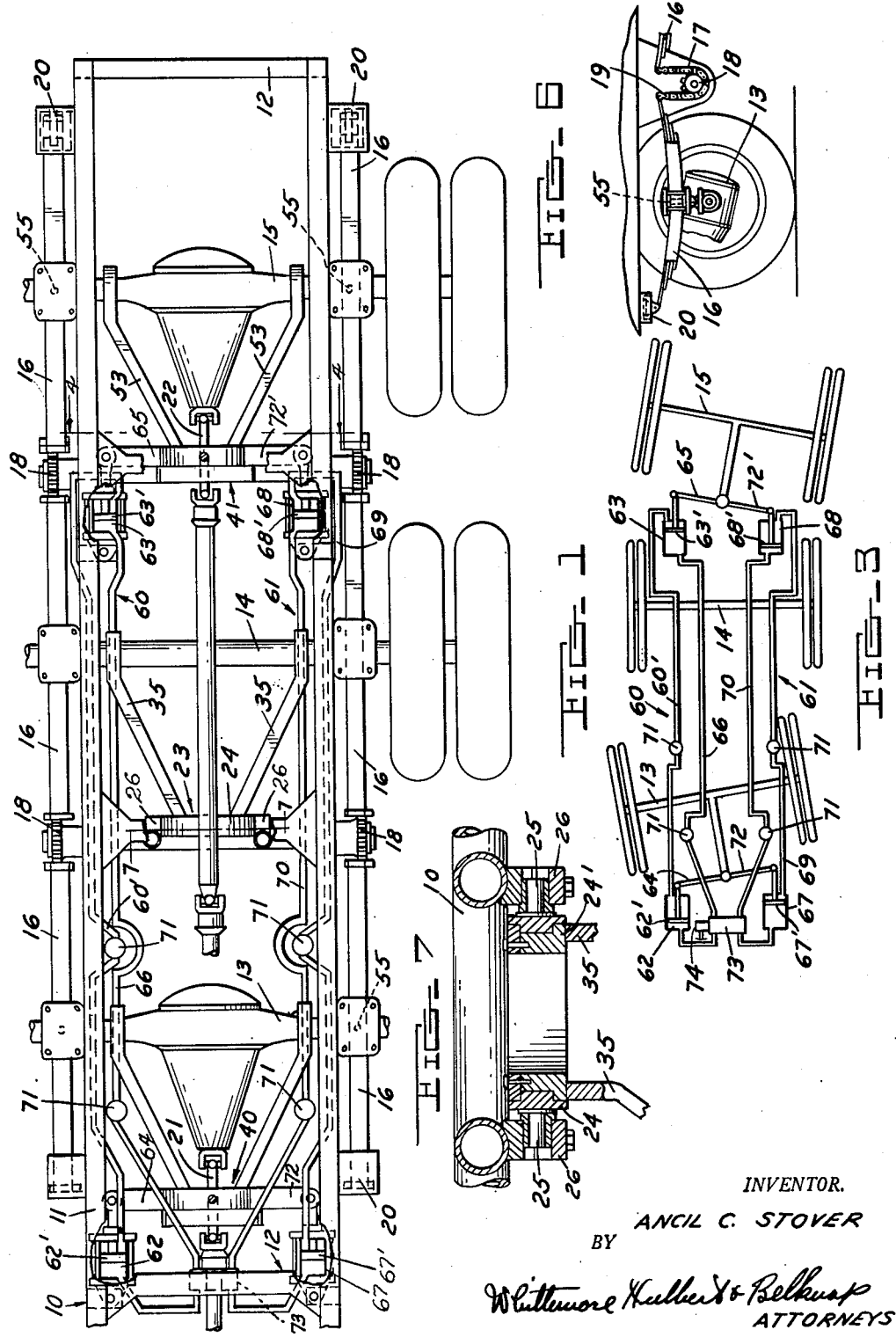

2,643,895

UNITED STATES PATENT OFFICE 2,643,895

SWINGABLE AXLE STABILIZER SYSTEM FOR PARALLELING NATURAL STEERING FORCES

Ancil C. Stover, Van Wert, Ohio, assignor to William W. Eisenhauer, William P. Ellwood, Ida J. Eisenhauer, and Leigh E. Eisenhauer, copartners, doing business as The Eisenhauer Manufacturing Company, Van Wert, Ohio Application October 3, 1949, Serial No. 119,222

2 Claims. (Cl. 280—81)

This invention relates to vehicles of the type having tandemly arranged axles supported for turning movement independently of one another about vertical axes.

In vehicles of the above general type, two or more of the axles are pivotally supported on the frame so that when the vehicle is turned from a straight course of travel by manipulation of the front steering wheels the pivoted axles will turn in the appropriate directions to enable the wheels on the pivoted axles to turn with the front steering wheels. This action has the advantage of minimizing side and lateral skidding of the ground engaging wheels when the vehicle is turned in one direction or the other but also has the disadvantage of decreasing the stability of the vehicle.

With the above in view, it is an object of this invention to provide a stabilizer system the function of which parallels the action of the steering forces that cause the pivoted axles to track with the front steering wheels. In this manner, the stabilizer system does not interfere with the natural tracking pattern assumed by the pivoted axles when a turn is negotiated, and at the same time it cancels out other forces tending to disturb the natural tracking pattern.

In accordance with this invention, a pair of axles are spaced apart longitudinally of the frame on opposite sides of, and equal distances from, the vertical axial center of suspension. Because of this arrangement, the axles in responding to their natural tracking functions will be caused to assume equal, opposite angles with respect to the longitudinal axis of the vehicle.

It is another object of this invention to connect one end of one pivoted axle to the corresponding end of a second pivoted axle with a closed hydraulic system having displacement means and to connect the other end of the first axle to the corresponding end of the second axle with a second closed hydraulic system also embodying displacement means.

In accordance with this invention, each displacement system comprises two cylinders having pistons slidably supported therein and respectively connected to corresponding ends of first and second axles in a manner such that turning movement of the axles displaces hydraulic fluid in the systems to maintain turning movement of the axles in opposite directions throughout substantially the same distance of angular travel. Accordingly the function of the hydraulic stabilizer system parallels the action of the natural steering forces and, therefore, does not interfere with the natural tracking pattern assumed by the pivoted axles.

One of the deflecting forces tending to disturb the natural steering pattern assumed by the pivoted axles is centrifugal force. This results from the constantly changing direction of forward movement of the vehicle and tends to cause the axles to turn in the same direction in their relation to the longitudinal centerline of the vehicle. The effect of centrifugal force is cancelled out by the hydraulic fluid system of this invention which prevents turning movement of the axles in the same direction.

In addition to centrifugal force, other conditions such as when uneven rolling resistance is met by either wheel of an axle, have a tendency to cause an axle to oscillate in opposition to the natural steering force. The functioning of the hydraulic fluid stabilizer is to combine the forces represented by the natural steering functions of two axles making available sufficient force to maintain directional stability, as these conditions are met by the individual axles.

It is a further object of this invention to provide selectively operable means for preventing fluid flow through the systems to thereby lock the axles against turning movement in either direction.

The foregoing as well as other objects will be made more apparent as this description proceeds, especially when considered in connection with the accompanying drawings, wherein:

Figure 1 is a fragmentary plan view of a tandem axle vehicle embodying the features of this invention;

Figure 2 is a side elevational view of the construction shown in Figure 1;

Figure 3 is a diagrammatic plan view showing the hydraulic fluid displacement systems between the turning wheels of the vehicle;

Figure 4 is a cross-sectional view taken on the line 4—4 of Figure 1;

Figure 5 is a sectional view taken on the line 5—5 of Figure 4,

Figure 6 is a fragmentary side elevational view showing the manner in which the suspension springs are mounted, Figure 7 is a sectional view taken on the line 7—7 of Figure 1; and Figure 8 is a diagrammatic sectional view of a typical shut-off valve which may be employed in the hydraulic displacement systems.

In Figure 1 of the drawings, I have shown a vehicle chassis having a frame 10 comprising side sills 11 secured in laterally spaced relationship by crossbars 12. Extending beneath the frame 10 in a direction transverse to the length of the frame is a plurality of axles designated by the numerals 13, 14 and 15. Each axle is connected to the frame 10 by a pair of semi-elliptical leaf springs 16 respectively supported at opposite sides of the frame for movement relative to the frame in the direction of length of the latter. As shown in Figure 6 of the drawings, the adjacent ends of the springs 16 at opposite sides of the frame 10 are connected together by chains 17 and sprockets 18. The sprockets 18 are supported for rotation on the frame below the adjacent ends of the springs and the chains 17 are respectively reeved over the undersides of the sprockets 18. The upper ends of the chains are respectively pivotally connected to the adjacent ends of the springs by suitable shackles 19 in a manner such that all of the springs cooperate to control movement of the chassis frame 10 relative to the axles. The springs 16 at opposite ends of the frame have the extremities thereof slidably supported on seats 20 which in turn are secured to the frame 10. Thus all of the springs are capable of limited shifting movement longitudinally of the frame 10. The pairs of leaf springs 16 at opposite sides of the frame 10 are respectively connected intermediate the ends thereof to the axles by any suitable type of clamping means which forms no part of the present invention and need not be described in detail.

In the present instance, the axle 13 is a driving axle and is operatively connected to the power source or internal combustion engine (not shown) by a suitable propeller shaft 21. The axle 15 is also shown herein as a driving axle and is connected to the power source or internal combustion engine (not shown) by a propeller shaft 22. The intermediate axle 14 is preferably an idler axle and merely cooperates with the other axles in supporting the load.

The axles 13, 14 and 15 are respectively connected to the chassis frame 10 for movement relative to the chassis frame independently of one another. The connection between the intermediate axle 14 and the frame 10 comprises a mounting 23. The mounting 23 comprises concentric rings 24 and 24'. The outer ring 24 is supported for swinging movement about a horizontal axis extending substantially parallel to the axis of the axle 14 and is positioned intermediate the side sills 11 of the frame 10. The inner ring 24' is supported by the outer ring 24 for rotation about the axis of the outer ring 24. The mounting 23 is shown in my copending application Serial No. 119,223, filed October 3, 1949, and is not described in detail herein. It will suffice to point out that the ring 24 has a pair of trunnions 25 suitably secured to diametrically opposite sides thereof and journaled in suitable bearing blocks 26. The bearing blocks 26 are suitably secured to a cross member of the frame 10 in positions to enable free rocking movement of the ring 24 about a horizontal axis extending substantially parallel to the axle 14. As shown in Figures 1 and 7 of the drawings, opposite end portions of the axle 14 are respectively connected to diametrically opposite sides of the ring 24' by struts 35. Thus the axle 14 may move angularly about the axis of the ring 24 and may also move in an up and down direction relative to the frame 10.

The axles 13 and 15, in addition to being connected to the chassis frame 10 for swinging and angular movement, are also capable of turning movement so as to turn with the front steering wheels (not shown) of the vehicle. The axle 13 is connected to the frame 10 by a mounting 40 and the axle 15 is connected to the frame 10 by a mounting 41. These two mountings are identical in construction and accordingly a description of one will suffice for both. With this in view, reference is made more in detail to Figures 4 and 5 of the drawings wherein the mounting 41 is shown in detail. This mounting comprises a double trunnion having an outer ring 42 and an inner ring 43. Two vertically aligned trunnions 44 are respectively secured to the top and bottom of the outer ring 42. The top trunnion 44 is journaled in a bearing 45 secured to a tubular crossbrace 46 intermediate the ends thereof. The bottom trunnion 44 is journaled in a bearing 47 which is secured to a second tubular brace 48 intermediate the ends of the latter. The tubular brace 46 extends between the side sills 11 of the frame 10 and is welded or otherwise permanently secured to the sills. The bottom tubular brace 48 extends between the lower ends of a pair of plates 49 having the upper ends respectively welded to the side sills 11. Suitable vertically extending gusset plates 50 extend between the tubes 46 and 48 at opposite ends of the latter. These plates are respectively welded to the depending plates 49 and are also welded to the tubes 46 and 48 in order to provide a rigid support for the mounting 41. The above construction is such that the mounting 41 is supported in a position to enable the propeller shaft 22 to be extended through the inner ring 43 of the mounting. The mounting 40 is supported in a similar manner on the chassis frame 10 in a position to enable free passage of the propeller shaft 21 through the inner ring.

Two trunnions 51 are secured to diametrically opposite sides of the inner ring 43 with their axes in alignment and extending parallel to the axis of the axle 15. The trunnions 51 are respectively journaled in bearings 52 secured to the outer ring 42 in a manner to permit swinging movement of the inner ring 43 relative to the outer ring 42 about a substantially horizontal axis which is parallel to the axis of the axle 15. It will further be noted from Figure 5 of the drawings that the ring 43 rotatably supports a ring section 43' in a manner such that the ring section may rotate freely about the axis of the ring 43.

The ring section 43' is connected at diametrically opposite sides to the axle 15 by a pair of struts 53 which may be similar in construction to the struts 35 previously described. In any case, the construction is such as to permit the axle 15 to turn about the vertical axis of the trunnions 44, to swing about the horizontal axis of the trunnions 51, and to move angularly about the axis of the ring 43. Since the mounting 40 is identical to the mounting 41, it follows that the axle 13 may move in a manner similar to the axle 15.

Since both the axles 13 and 15 are capable of turning movement about substantially vertically extending axes, it follows that the leaf springs 16 connecting these axles to the frame are subjected to lateral stresses during turning movement of the axles. In order to materially reduce these stresses, it is preferred to connect the leaf springs to the axles in a manner to enable limited rocking movement of the axles relative to the springs about the axes which extend generally parallel to the axes of turning movement of the axles. It will also be understood that the chains 17 and seats 20 allow lateral shifting movement of the springs 16 relative to the frame during rocking movement of the axles. A spring mounting capable of accomplishing the above result is shown generally in Figure 6 of the drawings and is designated by the numeral 55. This spring mounting forms the subject matter of my copending application Serial No. 119,224, filed October 3, 1949, now Patent Number 2,624,593, and is therefore not described in detail herein.

Due to the nature of the mountings 40 and 41 and owing to the frictional engagement of the ground engaging wheels on these axles with the road surface, it follows that both axles 13 and 15 will turn with the front steering wheels of the vehicle. It will be noted that the axles 13, 14 and 15 are spaced apart equal distances lengthwise of the frame so that axle 14 is at the center of suspension or support. Thus, axles 13 and 15 are on opposite sides of, and equidistant from, the center of suspension (Figure 2). This construction, taken in connection with the fact that the axes about which axles 13 and 15 turn are spaced from the respective axles to enable tracking with the front steering wheels (not shown), assures that the axles 13 and 15 will track by turning an equal amount in opposite directions when the vehicle is turned from a straight course. (Figure 3). Any deflecting forces tending to disturb the natural tracking pattern of axles 13 and 15 are countered by the hydraulic stabilizer system (described below), the function of which is to parallel the action of the steering forces which establish the natural tracking pattern.

With the above in view, reference is again made to Figure 1 of the drawings wherein it will be noted that opposite ends of the axles 13 and 15 are in effect respectively connected by two closed hydraulic systems designated generally by the numerals 60 and 61. As shown in Figure 3 of the drawings, the system 60 comprises a pair of cylinders 62 and 63 respectively supported on one side sill 11 of the frame adjacent the mountings 40 and 41. A piston 62' is slidably supported in the cylinder 62 and is operatively connected to one side of the outer ring 42 of the mounting 40 by an arm 64. A piston 63' is slidably supported in the cylinder 63 and is connected to the corresponding side of the ring 42 of the mounting 41 by an arm 65. The end of the cylinder 62 at the rear side of the piston 62' has a fluid connection 60' with the cylinder 63 at the rear side of the piston in this cylinder and the front end of the cylinder 62 is connected by a conduit 66 to the front end of the cylinder 63.

The fluid system 61 at the opposite side of the vehicle also has two cylinders 67 and 68 respectively supported on the adjacent side sill 11. The rear end of the cylinder 67 is connected to the corresponding end of the cylinder 68 by a conduit 69 and the front end of the cylinder 67 is connected to the front end of the cylinder 68 by a conduit 70. The piston 67' in the cylinder 67 is connected to the side of the ring 42 of the mounting 40 opposite the side to which the piston 62' is connected and this is accomplished by an arm 72. The piston 68' in the cylinder 68 is connected to the corresponding side of the ring 42 associated with the mounting 41 by an arm 72' which is opposed to the arm 65. Both systems include reservoirs 71 and are completely filled with a suitable hydraulic fluid medium.

It follows from the foregoing that when the axle 13 is turned about the vertically aligned axes of the trunnions 44 in an anti-clockwise direction as viewed in Figure 1 of the drawings, the pistons 62' and 67' in the respective cylinders 62 and 67 are moved in opposite directions by the ring 42 of the mounting 40 for the axle 13. More particularly, the piston 62' moves forwardly in the cylinder 62 and the piston 67' moves rearwardly in the cylinder 67. The displacement of hydraulic fluid medium in the two systems 60 and 61, resulting from the above movement of the pistons 62' and 67', creates a thrust tending to cause the piston 63' in the cylinder 63 to move rearwardly and the piston 68' in the cylinder 68 to move forwardly. Since the pistons 63' and 68' are respectively connected to opposite sides of the ring 42 associated with the mounting 41 and since this ring 42 is connected to the axle 15, it follows that the thrust created by pistons 62' and 67' tends to turn the latter axle in a clockwise direction or in a direction opposite the direction of turning movement of the axle 13 and in an amount equal to that of axle 13. Thus the effect of the hydraulic systems is to parallel the natural tracking pattern established by the steering forces when a turn is made. Moreover, any tendency for the axles to be deflected from the natural steering pattern is resisted and the stability of the vehicle is greatly improved.

Under some conditions, it may be advantageous to lock the axles 13 and 15 against turning movement with the front steering wheels and this may be accomplished by providing a shut-off valve 73 in the two hydraulic systems 60 and 61. This valve is normally open so that both hydraulic systems are operative and may be closed by manipulating an air valve 74 through a suitable control (not shown) located within the cab of the vehicle.

Figure 8 illustrates diagrammatically a typical shut-off valve which may be employed for the above purpose. This valve is shown by way of example only, since any suitable shut-off valve may be employed. Valve 73 comprises a cylindrical body 73' having pistons 74' slidably supported therein. Conduits 69 and 70 communicate with the body adjacent one end thereof and conduits 60' and 66 communicate with the body adjacent the other end. The conduits 69 and 70 and the conduits 60' and 66 normally communicate through the valve body, the pistons 74' being urged into engagement with each other at the center of the valve body by springs 74''. When it is desired to lock the axles 13 and 15 against turning movement, air valve 74 is manipulated to admit air from a source not shown into valve body 73' through conduit 73'' between the pistons, thus urging the latter apart against the action of the respective springs and into blocking relation to the conduits 69 and 70 and the conduits 60' and 66.

From the foregoing, it will be noted that the systems 60 and 61 actually provide a hydraulic balance between the axles 13 and 15, and assure turning of these axles in opposite directions throughout substantially the same distance of angular travel, notwithstanding lateral thrusts applied to either axle through the ground engaging wheels in the axles. Also, the two hydraulic systems 60 and 61, connecting corresponding ends of the axles 13 and 15, enable one axle to resist any deflecting forces applied to the other axle so that both axles cooperate to promote stability of the vehicle.

What I claim as my invention is:

1. A vehicle having in combination a frame, means for supporting the frame including a pair of axles extending in a direction transverse to the frame and spaced from each other lengthwise of the frame, means respectively pivotally supporting the axles on the frame for turning movement relative to the frame about substantially vertically extending axes, said axes being spaced from the respective axles lengthwise of the frame to enable said axles to turn in appropriate directions and conform to a natural steering pattern established upon turning of the frame from a straight course of travel, the center of support established by said means for supporting the frame being midway between said axles, whereby said axles turn in opposite directions throughout substantially the same angular extent in conforming to a natural steering pattern, and a pair of closed hydraulic displacement systems respectively interconnecting corresponding ends of the axles so that turning movement of one axle in one direction imparts a turning movement to the other axle in the opposite direction throughout substantially the same angular distance of travel, said systems being free from communication with each other and each having a pair of cylinders supported on the frame and having pistons respectively slidably supported in the cylinders, fluid conduits respectively connecting the cylinders of each system at opposite sides of the pistons, whereby sliding movement of one piston in its cylinder imparts a sliding movement to the other piston of the same system by the displacement of hydraulic fluid, and connections between the pistons of each system and the respective axles responsive to displacement of hydraulic fluid in said systems to cause a turning movement of the axles about their respective vertical axes in opposite directions and throughout substantially the same angular distance of travel.

2. A vehicle having in combination a frame, means for supporting the frame including a pair of axles extending in a direction transverse to the frame and spaced from each other lengthwise of the frame, means respectively pivotally supporting the axles on the frame for turning movement relative to the frame about substantially vertically extending axes, said axes being spaced from the respective axles lengthwise of the frame to enable said axles to turn in appropriate directions and conform to a natural steering pattern established upon turning of the frame from a straight course of travel, the center of support established by said means for supporting the frame being midway between said axles, whereby said axles turn in opposite directions throughout substantially the same angular extent in conforming to a natural steering pattern, and a closed hydraulic displacement system interconnecting said axles so that turning movement of one axle in one direction imparts a turning movement to the other axle in the opposite direction throughout substantially the same angular distance of travel, said system having a pair of cylinders supported on the frame and having pistons respectively slidably supported in the cylinders, fluid conduits respectively connecting the cylinders at opposite sides of the pistons, whereby sliding movement of one piston in its cylinder imparts a sliding movement to the other piston by the displacement of hydraulic fluid, and connections between the pistons of each cylinder and the respective axles responsive to displacement of hydraulic fluid to cause a turning movement of the axles about their respective vertical axes in opposite directions and throughout substantially the same angular distance of travel.

ANCIL C. STOVER.

References Cited in the file of this patent

UNITED STATES PATENTS

| Number | Name | Date |
|---|---|---|
| 590,536 | Boling | Sept. 21, 1897 |
| 1,066,072 | Bouas | July 1, 1913 |
| 1,210,055 | Fairman | Dec. 26, 1916 |
| 1,677,618 | Clement | July 17, 1928 |
| 2,047,088 | Thornton | July 7, 1936 |
| 2,167,943 | Fox | Aug. 1, 1939 |
| 2,269,728 | Mills | Jan. 13, 1942 |
| 2,432,018 | Keehn | Dec. 2, 1947 |

FOREIGN PATENTS

| Number | Country | Date |
|---|---|---|
| 9,235 | Great Britain | Apr. 21, 1904 |
| 98,040 | Austria | Sept. 25, 1924 |